United States Patent
Watanabe

(10) Patent No.: US 7,221,901 B2
(45) Date of Patent: May 22, 2007

(54) IMAGE SERVER AND IMAGE DISPLAY SYSTEM

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 377 days.

(21) Appl. No.: 10/421,711

(22) Filed: Apr. 24, 2003

(65) Prior Publication Data

US 2003/0204849 A1    Oct. 30, 2003

(30) Foreign Application Priority Data

Apr. 24, 2002    (JP) ............................. 2002-121578

(51) Int. Cl.
*H04H 1/00*        (2006.01)
(52) U.S. Cl. ................ 455/3.05; 455/66.1; 455/441.3; 455/466; 725/62; 725/86
(58) Field of Classification Search ............... 455/3.05, 455/3.01, 66.1, 414.1, 414.3, 414.4, 466; 725/62, 86, 91
See application file for complete search history.

(56) References Cited

U.S. PATENT DOCUMENTS

| | | | | |
|---|---|---|---|---|
| 6,798,838 | B1 * | 9/2004 | Ngo ...................... | 375/240.19 |
| 2002/0009987 | A1 * | 1/2002 | Tobita et al. ................ | 455/414 |
| 2002/0032905 | A1 * | 3/2002 | Sherr et al. .................... | 725/38 |
| 2003/0050062 | A1 * | 3/2003 | Chen et al. .................. | 455/435 |
| 2003/0054769 | A1 * | 3/2003 | Kalluri ......................... | 455/65 |
| 2003/0060190 | A1 * | 3/2003 | Mallart ........................ | 455/414 |
| 2003/0069004 | A1 * | 4/2003 | Hamynen et al. ........... | 455/412 |
| 2003/0177366 | A1 * | 9/2003 | de Jong ....................... | 713/184 |
| 2004/0113864 | A1 * | 6/2004 | Nonaka ...................... | 345/2.3 |
| 2004/0179659 | A1 * | 9/2004 | Byrne et al. ............. | 379/88.18 |

* cited by examiner

*Primary Examiner*—Edan Orgad
(74) *Attorney, Agent, or Firm*—Birch, Stewart, Kolasch & Birch, LLP

(57) ABSTRACT

The image display system for transmitting a movie picture conformable to reproducing ability of a mobile terminal such as a mobile phone, comprises an image database for recording a plurality of movie pictures associated with the identification information intrinsic to the movie picture, and the number of pixels or an image size of the movie picture or the type of the mobile phone, a receiving device for receiving the identification information for identifying the movie picture from the mobile phone and the information involving the image size or the type of the mobile phone, a retrieval device for retrieving the corresponding movie picture from the image database, using the identification information of the received movie picture and the image size or the type of the mobile phone, and a transmitting device for reading out and transmitting the retrieved movie picture from the movie database to the mobile phone. Thus, in the image server and the image display system, the rich contents of a movie picture can be automatically and efficiently retrieved and transmitted to a mobile phone with lower reproducing ability.

24 Claims, 7 Drawing Sheets

FIG.5

```
<?xml version="1.0" encoding="UFT-8"?>
<!DOCTYPE responce SYSTEM "button.dtd">
<play>
<max screen>
    <height>128</height>
    <width>96</width>
    <max-screen>
    <max-frame>15</max-frame>
    <max-bandwidth>64</max-bandwidth>
    <movie-codec>MPEG-4</movie-codec>
    <movie-codec>Motion-JPEG</movie-codec>
</play>
```

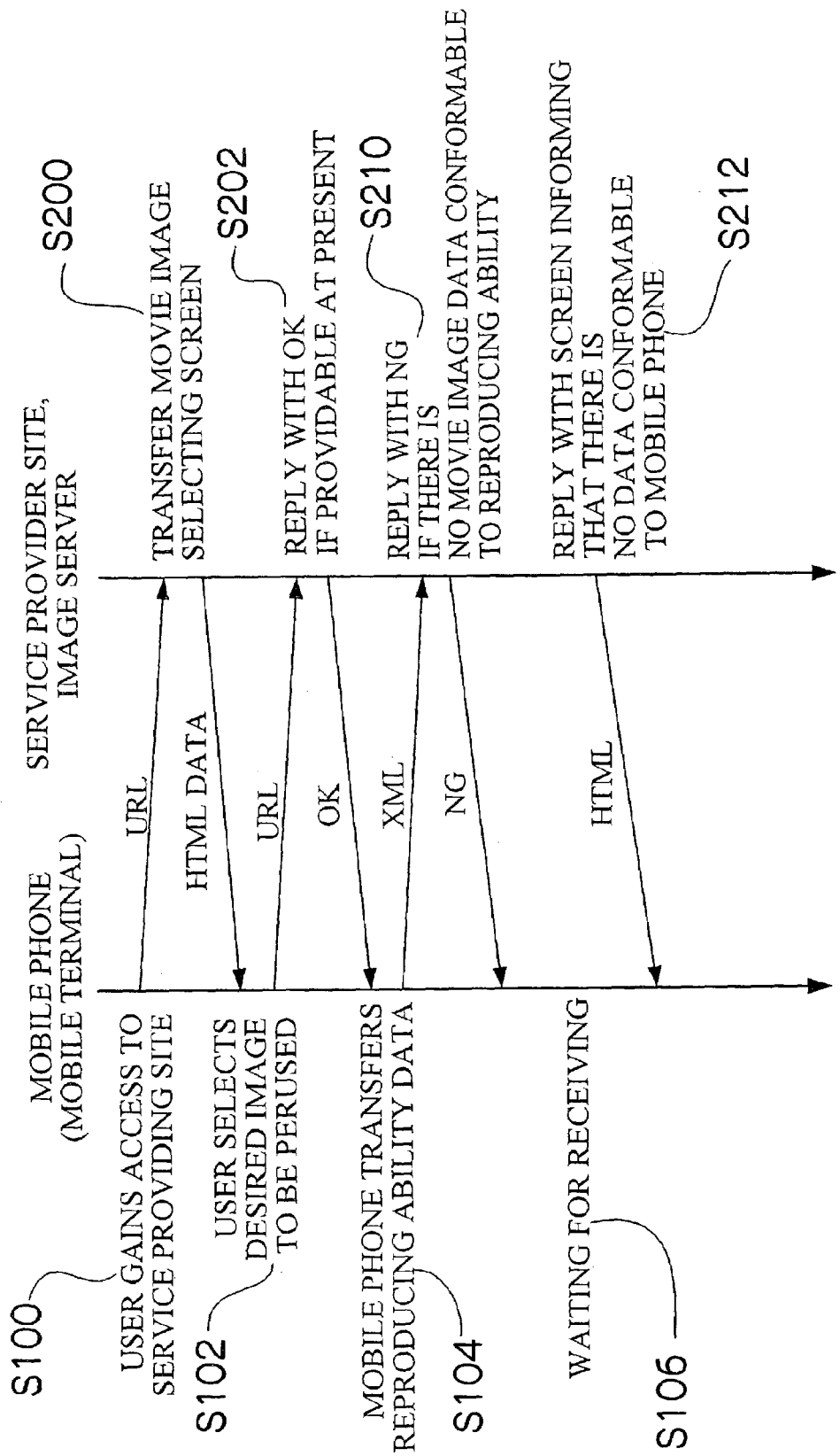

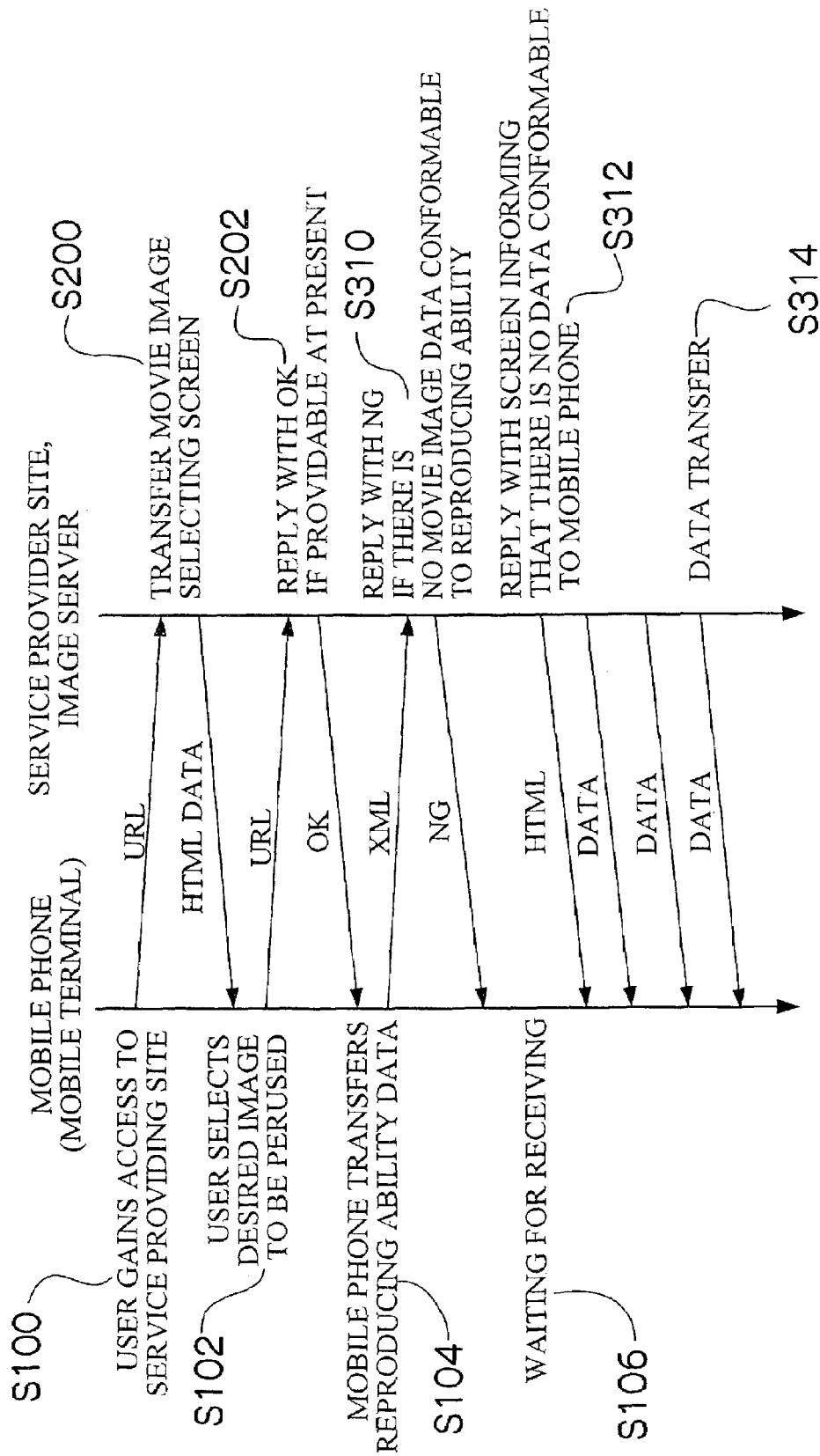

IMAGE SERVER AND IMAGE DISPLAY SYSTEM

This nonprovisional application claims priority under 35 U.S.C. § 119(a) on Patent Application No(s). 2002-121578 filed in JAPAN on Apr. 24, 2002, which is (are) herein incorporated by reference.

BACKGROUND OF THE INVENTION

1. Field of the Invention

The present invention relates to an image server and an image display system, and more particularly to an image server and an image display system for transmitting a movie picture to a mobile terminal in accordance with the reproducing ability of the mobile terminal.

2. Description of the Related Art

In recent years, along with the development of the third generation mobile phone service (high-speed data communication service), the transmission bandwidth for communication with the mobile phones is enhanced, whereby the rich contents including the movie picture can be distributed to the mobile phones.

However, although the third generation mobile phone service has been practiced, the small-sized mobile terminals such as a mobile phone and a personal information terminal (PDA) are limited in terms of the display size, because a display device such as a liquid crystal display can not be increased in size at the expense of the feature of portability due to its small size.

Though the transmission bandwidth of information is extended and the contents are rich, the mobile terminal is inferior to the personal computer with large screen in terms of its power of expression or the sense of use. An attempt has been made to increase the amount of information for display by setting the resolution, gradation and frame rate of the display device at values as large as possible for the applications of the mobile terminal.

Accordingly, the display devices having different reproducing ability (display ability) are provided depending on the uses of the mobile phone or personal information terminal. In this manner, even when the transmission bandwidth for communication with the mobile phones is increased along with the development of the third generation mobile phone service, it is required to receive and display an image having the number of pixels, gradation, frame rate, compression format, and reproduction bandwidth in accordance with the reproducing ability of the display device provided in the mobile terminal such as mobile phone (because the image having the number of pixels, gradation, frame rate, compression format, and reproduction bandwidth beyond the reproducing ability of the corresponding display device for the mobile phone is not sufficiently reproduced, even if it is received). Also, since the compression formats of image that can be handled by the mobile terminal are not unified, it is required to suitably selectively receive the image.

Conventionally, when the user wants to receive a desired image from an image server accumulating the images via a communication network such as the Internet and display it on the display device of the mobile terminal such as a mobile phone or personal information terminal, it is necessary for the user to examine whether or not the image having the resolution, gradation, or frame rate in accordance with the reproducing ability of the display device for the mobile terminal of the user can be provided in the image server, and selectively receive the image in accordance with the reproducing ability of the display device for the mobile terminal to display it on the display device for the mobile terminal.

In this case, the user needs to select the image adaptable to the display device of the mobile terminal by transmitting or receiving the information to or from the image server, as above described, and this operation is very troublesome for the user.

For example, this procedure is started by the user firstly operating the mobile terminal such as mobile phone to establish a communication connection to the image server via a communication network such as the Internet. Next, a menu page display file for displaying a menu page to download an image is acquired. Then, in the mobile terminal, the menu page is displayed on the display device on the basis of a description of the acquired menu page display file. Next, the user peruses the menu page, and performs an operation of selecting and receiving the image in a compression format reproducible with the type of the user's mobile terminal or its compatible type.

On the other hand, it is required for the service provider providing the image contents to convert the image into the data format conformable to the reproducing ability of the mobile terminal, every time there is an access for image acquisition from various kinds of mobile terminal. An operation of converting the image into the data format to conform to the reproducing ability of the mobile terminal each time (converting the number of pixels, gradation, frame rate, compression format of image) takes a greater amount of computation to increase the amount of processing in the image server, making it delayed to cope with a plurality of users involved in the communication connection. Especially in a case of the movie picture having a great amount of information, there is a significant increase in the computation amount in the image server, imposing a large burden.

SUMMARY OF THE INVENTION

The present invention has been achieved in the light of the above-mentioned problems, and it is an object of the present invention to provide an image server and an image display system in which the rich contents of a movie picture can be automatically and efficiently retrieved and transmitted to a mobile terminal with lower reproducing ability.

Also, it is another object of the present invention to provide an image server and an image display system in which an original movie picture can be automatically and efficiently converted into the rich contents of a movie picture conformable to the reproducing ability of a mobile terminal with lower reproducing ability to be transmitted to the mobile terminal, and recorded in an image database.

In order to attain the above-described object, the present invention is directed to an image server for transmitting a movie picture to a mobile terminal, wherein the image server retrieves a movie picture from an image database where a plurality of movie pictures are recorded, using identification information of the movie picture received from the mobile terminal and an image size of the movie picture including at least one of a number of pixels, a gradation, a frame rate, a compression format, a reproducible bandwidth, or a type of the mobile terminal in terms of reproducing ability of the mobile terminal, and transmits the movie picture to the mobile terminal.

With the present invention, using the identification information of the movie picture received from the mobile terminal, and the number of pixels, gradation, frame rate, compression format, reproducible bandwidth or image size of the movie picture, or the type of the mobile terminal in terms of the reproducing ability, the corresponding movie picture is retrieved from the image database where a plurality of movie pictures are recorded, and transmitted to the mobile terminal, whereby the image server can automatically and efficiently retrieve and transmit the rich contents of the movie picture to the mobile terminal with lower reproducing ability.

In order to attain the above-described object, the present invention is also directed to an image server for converting an original movie picture into a movie picture conformable to reproducing ability of a mobile terminal and transmitting the movie picture, the image server comprising: an image converting device which retrieves the original movie picture from an original image database where a plurality of original movie pictures are recorded, according to identification information of the movie picture received from the mobile terminal, and converts the retrieved original movie picture into the movie picture conformable to the reproducing ability of the mobile terminal, using at least one of a number of pixels, a gradation, a frame rate, a compression format, a reproducible band width, and an image size of the movie picture received from the mobile terminal, or a type of the mobile terminal; and a transmitting device which transmits the converted movie picture to the mobile terminal.

With the present invention, the image server comprises the image converting device for retrieving the corresponding movie picture from the original image database where a plurality of original movie pictures are recorded, on the basis of the identification information of the movie picture received from the mobile terminal, and converting the retrieved original movie picture into the movie picture conformable to the reproducing ability of the mobile terminal, using the number of pixels, gradation, frame rate, compression format, reproducible bandwidth or image size of the movie picture received from the mobile terminal, or the type of the mobile terminal, and the transmitting device for transmitting the converted movie picture to the mobile terminal. Therefore, the image server can automatically and efficiently convert and transmit the original movie picture into the rich contents of the movie picture conformable to the reproducing ability of the mobile terminal with lower reproducing ability.

In order to attain the above-described objects, the present invention is also directed to an image display system for transmitting a movie picture conformable to reproducing ability of a mobile terminal, the image display system comprising: a mobile terminal which automatically transmits to an image server an image size of the movie picture reproducible on the mobile terminal including at least one of a number of pixels, a gradation, a frame rate, a compression format, and a reproducible bandwidth, or a type of the mobile terminal including reproducing ability, and displays on a display device the movie picture in accordance with the image size or the type of the mobile terminal received from the image server; and the image server which retrieves the corresponding movie picture from an image database where a plurality of movie pictures are recorded, using the image size of the movie picture or the type of the mobile terminal received from the mobile terminal, and transmits the retrieved movie picture to the mobile terminal.

With the present invention, the image display system for transmitting a movie picture conformable to the reproducing ability of the mobile terminal comprises the mobile terminal for automatically transmitting to the image server the number of pixels, the gradation, the frame rate, the compression format, the reproducible bandwidth, or the image size of the movie picture reproducible on the mobile terminal, or the type of the mobile terminal in terms of the reproducing ability, and displaying on the display device the movie picture in accordance with the image size or the type of the mobile terminal received from the image server, and the image server for retrieving the corresponding movie picture from the image database where a plurality of movie pictures are recorded, using the image size of the movie picture or the type of the mobile terminal received from the mobile terminal and transmitting it to the mobile terminal. Therefore, the image server can automatically and efficiently transmit the rich contents of the movie picture to the mobile terminal with lower reproducing ability.

BRIEF DESCRIPTION OF THE DRAWINGS

The nature of the present invention, as well as other objects and advantages thereof, will be explained in the following with reference to the accompanying drawings, in which like reference characters designate the same or similar parts throughout the figures and wherein:

FIG. 5 is a description example of describing the reproducing ability of the mobile terminal with xml;

FIG. 6 is a chart showing another embodiment processing flow for reproducing and displaying the image on the mobile terminal; and FIG. 7 is a chart showing a further embodiment processing flow for reproducing and displaying the image on the mobile terminal.

DETAILED DESCRIPTION OF THE PREFERRED EMBODIMENTS

The preferred embodiments of an image server and an image display system according to the present invention will be described below in detail with reference to the accompanying drawings.

Figure 1:
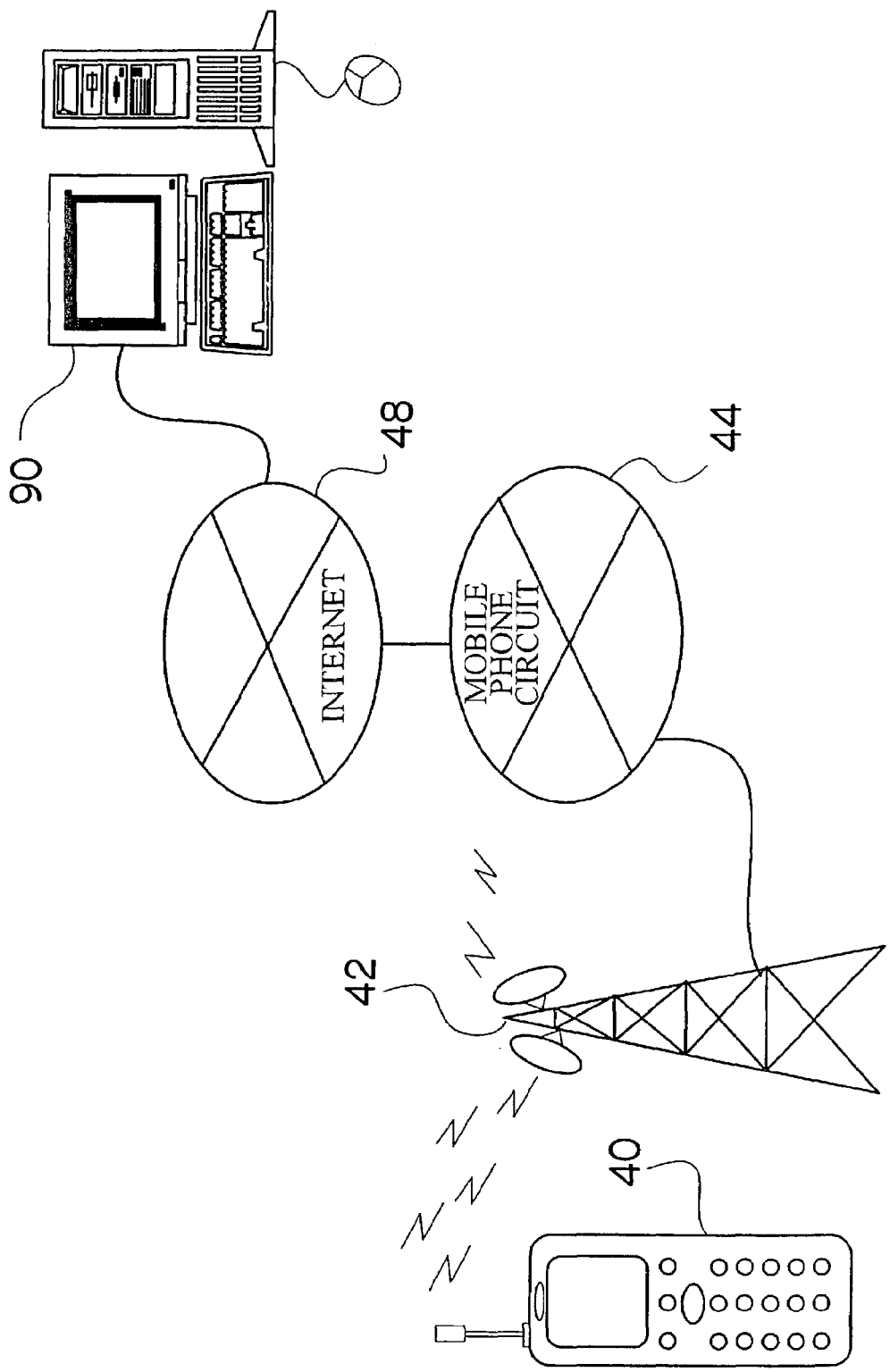
FIG. 1 is a diagram showing a configuration example of an image display system comprising an image server according to the present invention.

FIG. 1 shows a configuration example of an image display system comprising an image server according to the present invention.

As shown in FIG. 1, the image display system is provided with a mobile phone 40, carried by the user, which can reproduce and display a movie picture on a display device such as an LCD, a base station 42 for making the radio communication with the mobile phone 40, a mobile phone circuit 44 for the mobile phone 40, a communication network 48 such as the Internet, and an image server 90 that can make the communication connection with the communication network 48.

The communication connection between the mobile phone circuit 44 and the communication network 48 is enabled, whereby the mobile phone 40 can transmit or receive the movie picture and other information via the base station 42, the mobile phone circuit 44 and the communication network 48 to or from the image server 90.

The user operates the mobile phone 40 to gain access to the image server 90 and peruse a display list of images transmitted from the image server 90. The user only needs to select a desired image to automatically receive the image from the image server 90 in accordance with the reproducing ability of the mobile phone 40 and display it on the display device of the mobile phone 40.

Figure 2:
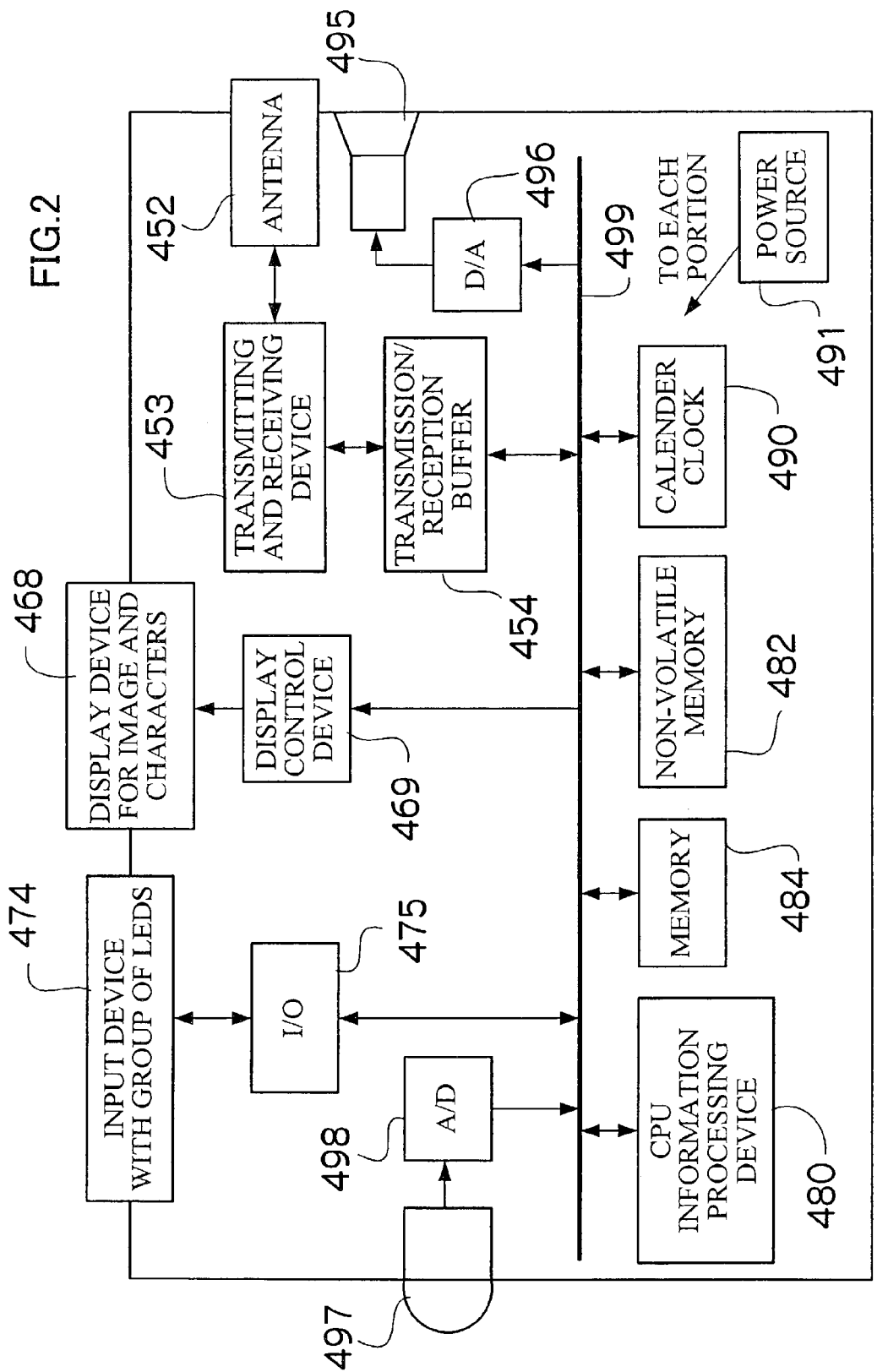
FIG. 2 is a block diagram of a signal processing system in a mobile phone that is one form of the mobile terminal.

FIG. 2 is a block diagram of a signal processing system in the mobile phone 40 that is one form of the mobile terminal.

As shown in FIG. 2, an information transmitting and receiving portion of the mobile phone 40 is provided with an antenna 452 for making the radio communication with the public network, a transmitting and receiving device 453 for the public network, and a transmission/reception buffer 454 for temporarily storing the information transmitted or received in real time.

Also, the mobile phone 40 is provided with a display device 468 for displaying various kinds of information such as still image, movie picture and characters, a display control device 469 for outputting a display image signal to the display device 468 on the basis of an instruction of the information processing device, and an I/O 475 for reading various kinds of information input by the user employing an input device 474 to pass them to the information processing device described below and outputting a display instruction to an informing device such as an LED on the basis of an instruction from the information processing device.

Also, the mobile phone 40 is provided with the information processing device (CPU) 480 for controlling the overall mobile phone 40, a rewritable non-volatile memory 482 for recording various kinds of constants regarding the processing of the mobile phone and the connection information such as a dial-up telephone number, attribute information, URL (Uniform Resource Locators), an IP (Internet Protocol) address, and a gateway information DNS (Domain Name System) in making the communication connection with the communication equipment on the network, a memory 484 comprising a ROM that records the programs and various kinds of constants for operating the information processing device 480 and a RAM that is a storage device serving as a working area for the information processing device 480 to perform the processing, and a calendar clock 490 for clocking the time, and a power source 491 for supplying a power to the circuits including the information processing device 480.

Also, the mobile phone 40 is provided with a speaker 495 serving as a telephone receiver when employed as a telephone set by the user as well as outputting the voice, a D/A converter 496 for converting the voice data output by the information processing device 480 into an analog voice signal to be amplified and output to the speaker 495, a microphone 497 for inputting voice and transform it to sound signal, and an A/D converter 498 for amplifying a voice signal input from a microphone 497 and converting the voice signal into the voice data to be passed to the information processing device 480.

The information processing device 480 within the mobile phone 40 is connected to the peripheral devices including the transmission/reception buffer 454, a display control device 469, I/O 475, non-volatile memory 482, memory 484, calendar clock 490, D/A converter 496, and A/D converter 498 via a bus 499, and controls each of the peripheral devices to make high speed transmission and reception of information. Therefore, the information processing device 480 can control each peripheral circuit based on a processing program to be executed.

In the above description, the mobile phone 40 is employed as an example of the mobile terminal. However, the mobile terminal may be a mobile personal computer, a personal information terminal, or an electronic pocketbook, as long as the communication equipment has an image display device or communication device.

The transmitting and receiving device 453 (as the first transmitting device) can automatically transmit to the image server 90 the number of pixels, gradation, frame rate, compression format, reproducible bandwidth, or the image size for the movie picture reproducible on the mobile phone 40, and the type of the mobile phone 40 in terms of the reproducing ability based on an instruction of the information processing device 480.

Also, the transmitting and receiving device 453 (as the first receiving device) can receive the movie picture in accordance with the image size or the type of the mobile phone 40 from the image server 90.

The display device 468 can display the movie picture received from the image server 90. Also, the information processing device 480 expands the image data of a still image or movie image received from the image server in accordance with a method represented by JPEG, motion JPEG or MPEG, and displays the received image on the display device 468.

Figure 3:
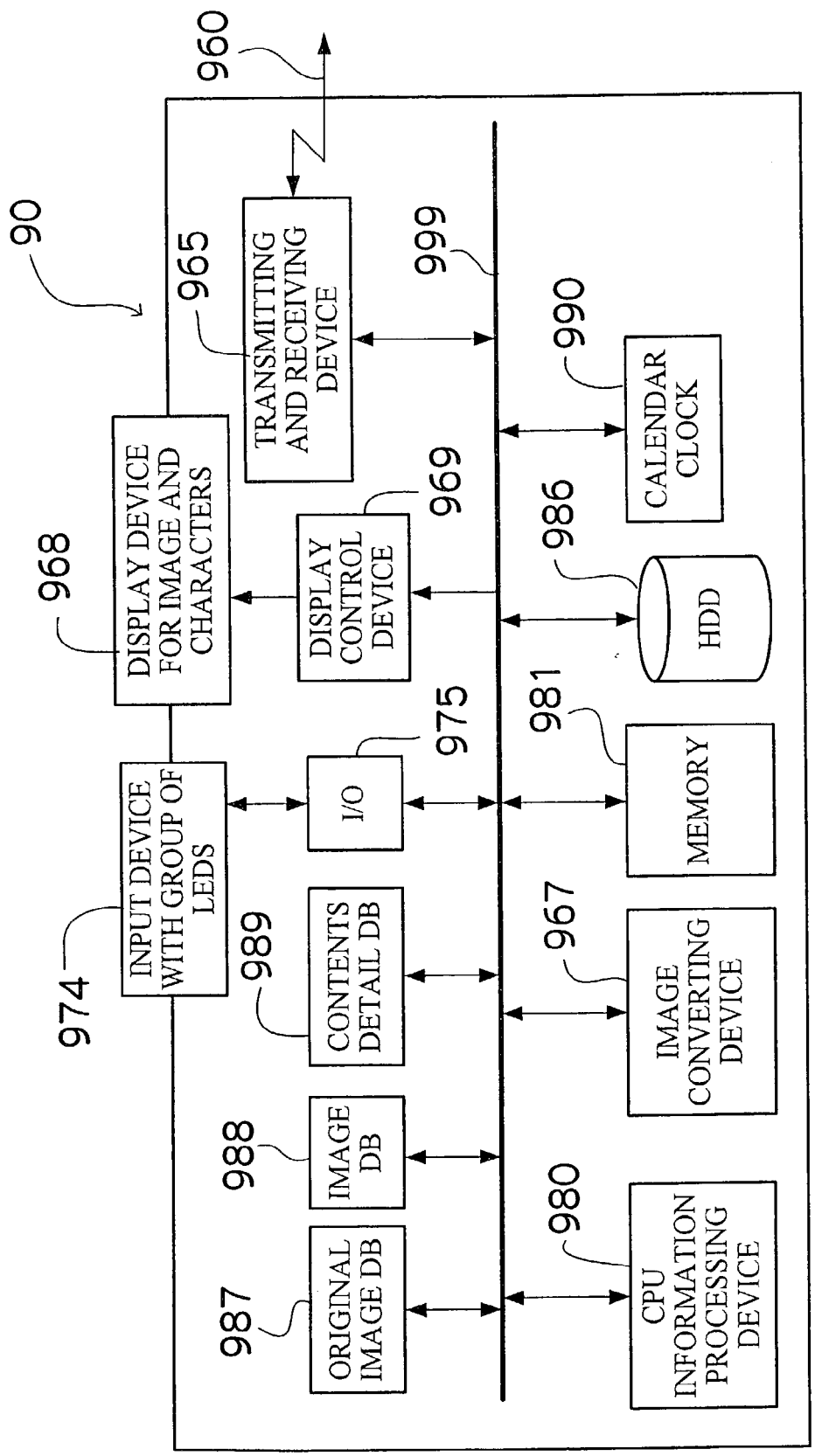
FIG. 3 is a block diagram of a signal processing system in an image server according to the present invention.

FIG. 3 is a block diagram of the signal processing system in the image server according to the present invention.

As shown in FIG. 3, the information transmitting and receiving portion of the image server 90 is provided with a transmitting and receiving device 965 for transmitting or receiving the information to or from other communication equipment (personal computer, mobile phone 40 or mobile terminal such as personal information terminal) via a communication line 960, a router and the communication network 48.

Also, the image server 90 is provided with an image converting device 967 for performing the image processing of compressing the original image data of still image or movie image in accordance with a method represented by JPEG, motion JPEG or MPEG, attenuating the number of pixels or gradation, changing the frame rate, thinning the pixel or image, or expanding the compressed image data, and displaying the displayable image on the display device of each mobile terminal.

Also, the image server 90 is provided with the display device 968 for displaying the information such as image or character for confirmation, as need, a display control device 969 for outputting a display image signal to the display device 968 upon an instruction of the information processing device, and an I/O 975 for reading various kinds of information input by the administrator using the input device 974 and passing it to the information processing device described below, and outputting a display instruction to the informing device such as an LED upon an instruction from the information processing device.

Also, the image server 90 is provided with the information processing device (CPU) 980 for controlling the overall image server 90, a memory 981 comprising a ROM that records the programs and various kinds of constants for operating the information processing device 980 and a RAM that is a storage device serving as a working area for the information processing device 980 to perform the processing, a recording device 986 such as a hard disk for recording various kinds of constants regarding the processing of the image server 90 and the connection information such as self attribute information on the network, URL (Uniform Resource Locators), address, site address, and a gateway information DNS (Domain Name System), and a calendar clock 990 for clocking the time.

Also, the image server 90 is provided with an image database 988 that records plural kinds of image data of still image or movie image displayable on the display device of each mobile terminal, and an original image database 987 that records the original image data before image conversion and a thumb-nail image that is reduced from the original images.

Also, the image server 90 is provided with a contents detail database 989 that records various kinds of information, such as the link file listing link information for associating the type of mobile terminal with the image data available on the mobile terminal, the title of recorded image data, and the size of image data to be able to extract the image data corresponding to each mobile terminal.

As shown in FIG. 3, the information processing device 980 is connected to the peripheral devices including the display control device 969, I/O 975, memory 981, recording device 986, and calendar clock 990 via a bus 999, and cum control each peripheral device and controls each of the peripheral devices on the basis of the processing program executed by the information processing device 980.

The image database 988 can record plural pieces of data comprising the movie picture and the identification information intrinsic to the movie picture, with the number of pixels, gradation, frame rate, compression format, reproducible bandwidth, or the image size for the movie picture, or the type of the mobile terminal in terms of the reproducing ability.

Also, the transmitting and receiving device 965 (as receiving device, as the second receiving device) can receive from the mobile phone 40 the information such as the identification information of movie picture and the image size or the type of mobile terminal in terms of the reproducing ability.

The information processing device 980 (as the retrieving device) can retrieve the corresponding movie picture from the image database 988, employing the identification information of the received movie picture and the image size or the type of mobile terminal.

Also, the transmitting and receiving device 965 (as transmitting device, as the second transmitting device) can read the retrieved movie picture from the movie picture database and transmit it to the mobile phone 40.

Also, the original image database 987 can record the original movie picture associated with the identification information intrinsic to the original movie picture.

The image converting device 967 can read the original image associated with the identification information intrinsic to the movie picture that is recorded in the original image database 987, on the basis of the identification information intrinsic to the movie picture that is received by the transmitting and receiving device 965, and convert it into the movie picture conformable to the image size or the type of mobile terminal received via the transmitting and receiving device 965.

Also, the information processing device 980 can record the image converted by the image converting device 967 in the image database 988.

Also, the transmitting and receiving device 965 can transmit the image converted by the image converting device 967 to the mobile phone 40.

In the case where the image data of still image or movie image is registered in the original image database 987 for the image server 90, the image data itself transmitted from the image provider and its thumb-nail image comprising the reduced images are registered in the original image database 987. Also, the contents detail database 989 records the title, aspect pixel (image size), gradation, frame rate, reproducible bandwidth (including transmittable bit rate), and compression format name of transmitted image data.

And the contents detail database 989 also records the link information to the image database 988 to extract the image data. The same original image data may be converted in terms of the aspect ratio of pixels and the compression format by the image converting device 967 for various kinds of mobile terminal, and recorded in the image database 988 for each of different image formats.

Figure 4:
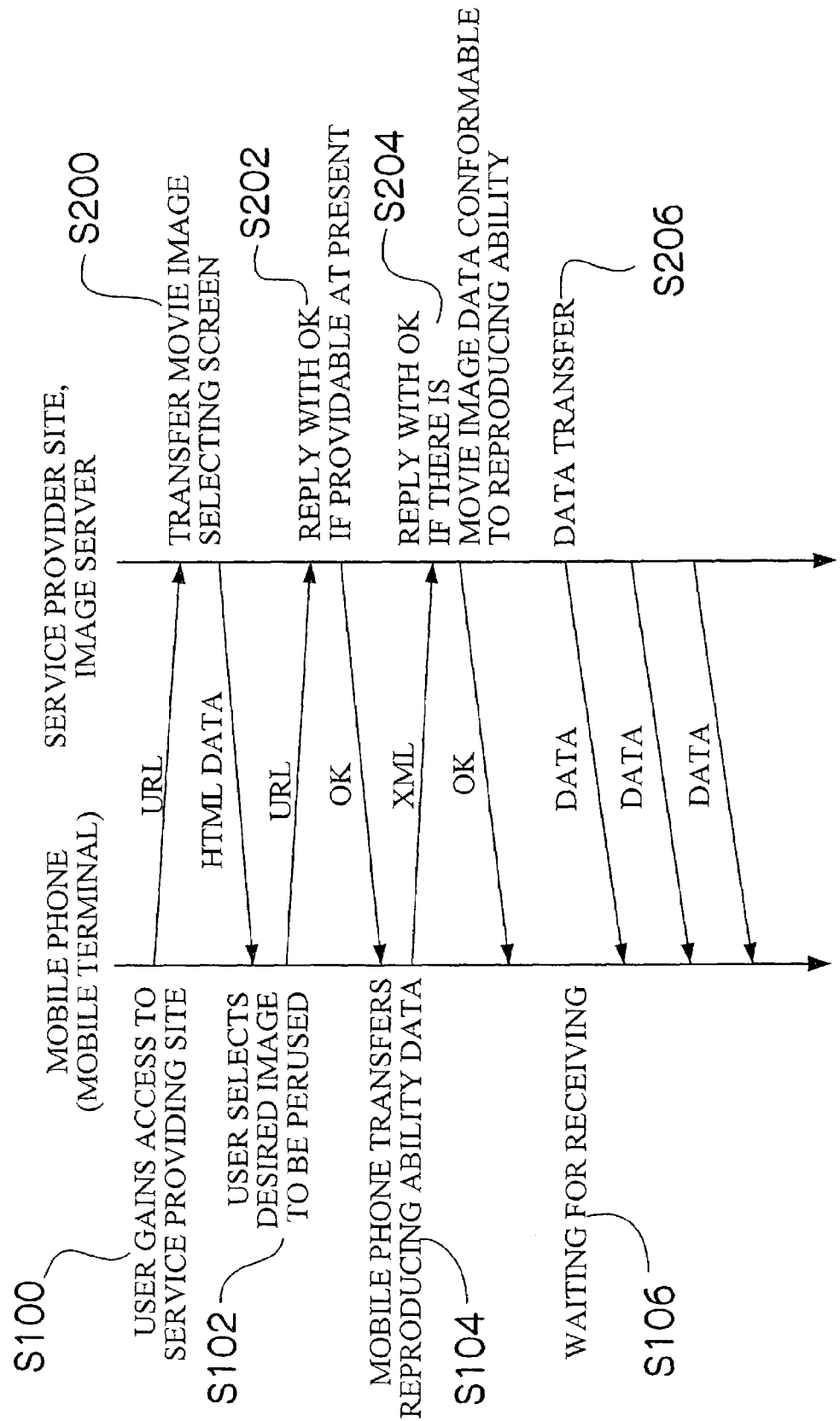
FIG. 4 is a chart showing a processing flow for reproducing and displaying the image on the mobile terminal.

FIG. 4 is a chart showing a processing flow for reproducing and displaying the still or movie image on the mobile terminal. The process as shown in FIG. 4 is performed in the case where the image data according to the reproducing ability of the mobile phone 40 is recorded beforehand in the image database 988 of the image server 90.

As shown in FIG. 4, at step S100 "user gains access to service providing site" (hereinafter abbreviated as S100), the user operates the mobile phone 40 (as one form of mobile terminal) to start access to the image server 90 that is the service providing site of the image. In this case, when the Internet is used as the communication network 48, the information indicating the use of an HTML transfer protocol with HTTP and the information of URL designating the image server 90 are transmitted by the transmitting and receiving device 453 of the mobile phone 40.

The information of URL is transmitted via the base station 42, the mobile phone circuit 44 and the communication network 48 to the image server 90. If the information processing device 980 of the image server 90 receives the information of URL via the transmitting and receiving device 965, the thumb-nail image for the image data of still or movie image recorded in the original image database 987 and a display file (display program file described in HTML) for displaying the title of image and a list of information indicating whether the movie or still image are read from the recording device 986. At S200 "movie picture selection screen transfer", they are transmitted via the transmitting and receiving device 965 to the mobile phone 40.

The list display file for the image and the thumb-nail image are transmitted via the communication network 48, the mobile phone circuit 44 and the base station 42 to the mobile phone 40. If the information processing device 480 of the mobile phone 40 receives the display file and the thumb-nail image via the transmitting and receiving device 453, it displays an image list based on the description of the received display file on the display device 468.

The user peruses the thumbnail image and the display list such as the thumbnail displayed in the display device 468 of the mobile phone 40 and the title of image to select a desired image to be downloaded and input it by operating the input device 474 provided in the mobile phone 40.

If the information indicating the image selected via the input device 474 is entered, the operation of the information processing device 480 proceeds to S102 "user selects a desired image to be perused" to issue an instruction of transmitting the information indicating that the image input via the input device 474 is selected along with the URL of the image server 90 of transmission destination and the intrinsic ID or URL of the mobile phone 40, via the transmission/reception buffer 454, the transmitting and receiving device 453 and the antenna 452 to the image server 90.

The information processing device 980 of the image server 90 receives the information indicating that the image is selected via the transmitting and receiving device 965. Then, the operation of the information processing device 980 proceeds to S202 "reply with OK if providable at present", where a determination is made whether or not the received image is recorded in the image database 988, the original image database 987 or the recording device 986, and providable to the mobile phone 40 of the user.

As a result of determination, if the image is providable at present, "OK" is returned via the transmitting and receiving device 965 to the mobile phone 40. Also, if the image is not providable to the mobile phone 40, "NG" is returned via the transmitting and receiving device 965 to the mobile phone 40.

If the information of "OK" is received via the transmitting and receiving device 453, the operation of the information processing device 480 proceeds to S104 "mobile phone transfers reproducing ability data" to read the information regarding the reproducing ability of the display device 468 or the type of mobile phone 40 recorded in the memory 484 or the non-volatile memory 482 and transmit it via the transmitting and receiving device 453 to the image server 90.

FIG. 5 is a description example of describing the reproducing ability to be transmitted to the image server 90 with xml.

In the description as shown in FIG. 5, the information between tag <PLAY> and </PLAY> represents the reproduction condition or reproducing ability of the mobile phone 40.

Maximum image size in length: 128 (pixels)
Maximum image size in width: 96 (pixels)
Maximum frame rate: 25 (fps)
Maximum reproducible bandwidth: 64 (kbps)
Corresponding movie image compressing method:
  MPEG4
  Motion-JPEG As shown in FIG. 5, if the reproduction conditions are recorded in the xml format, and returned to the image server 90, the retrieval process or rewriting the description can be made in the same manner as for the general-purpose database, whereby the version-up of mobile terminal or the extension of functions can be easily dealt with.

If the information regarding the reproducing ability of the mobile phone 40 or the type of mobile phone 40 is received, the operation of the information processing device 980 in the image server 90 proceeds to S204 "reply with OK if there is movie image data conformable to reproducing ability". At step S204, the information processing device 980 reads the title, the aspect ratio of pixels, gradation, frame rate, reproducible bandwidth and compression format name of the image data recorded in the contents detail database 989, and makes a determination (retrieval) whether or not the image data of still or movie image conformable to the reproducing ability is present by collation with the information regarding the received reproducing ability.

Also, the determination may be made by determining whether or not the image data conformable to the received reproducing ability is recorded in the image database 988.

If it is determined that the image data conformable to the reproducing ability is present (retrieved), the information processing device 980 returns "OK" via the transmitting and receiving device 965. Also, if the image data conformable to the reproducing ability is not present, "NG" is returned to the mobile phone 40 (this operation of returning "NG" will be described later at S210 of FIG. 6).

If "OK" is returned to the mobile phone 40, the information processing device 980 reads the image data specified by the user from the image database 988 on the basis of the link information recorded in the contents detail database 989.

Then, at the next step S206 "data transfer", the read image data is transmitted successively via the transmitting and receiving device 965 to the mobile phone 40, employing a method of packet communication.

If the information processing device 480 receives the information of "OK" via the transmitting and receiving device 453, the operation of the information processing device 480 proceeds to step S106 "waiting for receiving" to wait for the image data having the demanded reproducing ability to be received and record the transmitted image data sequentially in the recording device such as the memory 484 or the non-volatile memory 482. And if all the image data is received, the information processing device 480 makes an instruction of displaying the received compressed image data on the display device 468 by subjecting it to predetermined expansion processing. Then, the still image or movie picture specified by the user is displayed on the display device 468.

FIG. 6 shows a processing flow for reproducing and displaying the still image or movie image on the mobile terminal. The processing flow of FIG. 6 is made in the case where the image data conformable to the reproducing ability of the mobile phone 40 is not prerecorded in the image database 988 of the image server 90.

Steps S100 to S106 and S200 to S202 in FIG. 6 are the same as those in FIG. 4, and not described below.

If the image server 90 receives the information regarding the reproducing ability of the mobile phone 40 that is transferred by the mobile phone 40 at step Si 104, or the information of the type of mobile phone 40, the operation of the information processing device 980 for the image server 90 proceeds to step S210 "reply with NG if there is no movie image data conformable to reproducing ability". At step S210, the information processing device 980 reads the title, the aspect ratio of pixels, gradation, frame rate, reproducible bandwidth, and compression format name of the image data recorded in the contents detail database 989, and makes a determination (retrieval) whether or not the image data of still image or movie image conformable to the reproducing ability is present by collation with the information regarding the received reproducing ability.

As a result of the determination, if the image data conformable to the reproducing ability is not present, "NG" is returned to the mobile phone 40. At the next step S212 "reply with screen informing that there is no data conformable to the mobile phone", the information processing device 980 generates or reads a display file (display program file described in HTML) recorded in the recording device 986, and transmits it via the transmitting and receiving device 965 to the mobile phone 40. The display file contains the information warning the user that the image data conformable to the reproducing ability of the display device 468 of the mobile phone 40 is not provided because it is not recorded in the image database, which is displayed on the display device 468 of the mobile phone 40.

On the other hand, if the information processing device 480 receives the information of "NG" from the image server 90 via the transmitting and receiving device 453, the operation of the information processing device 480 proceeds to step S106 "waiting for receiving" to wait for the next display file to be transmitted from the image server 90.

Also, if the information processing device 480 receives the display file from the image server 90, it displays the information described in the received display file on the display device 468 of the mobile phone 40.

In the above embodiment, "NG" is returned if the image data conformable to the reproducing ability of the mobile phone 40 is not present at step S210. However, the information processing device 980 may generate the new image data conformable to the reproducing ability of the display device 468 of the mobile phone 40 from the original image data. A processing flow thereof will be described below.

FIG. 7 shows a processing flow for reproducing and displaying the still image or movie image on the mobile terminal. The processing flow of FIG. 7 is made in the case where the image data conformable to the reproducing ability of the mobile phone 40 is not prerecorded in the image database 988 of the image server 90, and the new image data conformable to the reproducing ability is generated and transmitted to the mobile phone 40.

Steps S100 to S106 and S200 to S202 in FIG. 7 are the same as those in FIG. 4, and not described below.

At step S310 "reply with NG if there is no movie image conformable to the reproducing ability", the information processing device 980 of the image server 90 receives the information regarding the reproducing ability of the mobile phone 40 or the information of the type of mobile phone 40. Then, the information processing device 980 reads the title, the aspect ratio of pixels, gradation, frame rate, reproducible bandwidth, and compression format name of the image data recorded in the contents detail database 989, and makes a determination (retrieval) whether or not the image data of still image or movie image conformable to the reproducing ability is present by collation with the information regarding the received reproducing ability.

Also, this determination may be made by determining whether or not the image data conformable to the received reproducing ability is recorded in the image database 988. As a result of the determination, if the image data conformable to the reproducing ability is not present, "NG" is returned to the mobile phone 40, and the image data conformable to the received reproducing ability of the mobile phone 40 is created.

At step S312 "reply with screen informing that there is no image data conformable to mobile phone", the information processing device 980 generates a display file describing in HTML a warning that the image data conformable to the reproducing ability of the mobile phone 40 is not present, and the information of "creating" indicating that the original image data is being currently converted into the image data conformable to the reproducing ability of the mobile phone 40 and transmits it to the mobile phone 40.

At step S310 and ensuing steps, the information processing device 980 reads the image data specified by the user from the original image database 987, and outputs the read original image data and the information regarding the reproducing ability of the display device 468 for the mobile phone 40 to the image converting device 967.

The image converting device 967 having acquired the original image data and the information regarding the reproducing ability of the display device 468 for the mobile phone 40 creates the image data for the mobile phone 40 according to the number of pixels, gradation, frame rate, or compression format of the original image on the basis of the information regarding the acquired reproducing ability.

When receiving the information about the type of mobile phone 40, instead of receiving the information regarding the reproducing ability of the mobile phone 40 from the mobile phone 40, the image server 90 outputs the information regarding the reproducing ability to the image converting device 967 in the following manner. The recording device 986 prerecords the types of a plurality of mobile terminals including the mobile phone 40 associated with the information regarding the reproducing ability of the mobile phone 40 or each mobile terminal. The information processing device 980 retrieves and reads the information regarding the reproducing ability of the corresponding mobile phone 40 recorded in the recording device 986, on the basis of the received type of mobile phone 40. Then, the information processing device 980 outputs the information regarding the read reproducing ability and the read original image data to the image converting device 967.

If the image converting device 967 ends an image converting process, the image data after conversion is recorded in the image database 988. And the information processing device 980 records a link file describing the link information that associates the image data after conversion with the type of mobile phone 40 (kind of mobile terminal) and various kinds of information including the title and size of recorded image data in the contents detail database 989.

At step S314 "data transfer", the information processing device 980 reads the image data after conversion from the image database 988, using a method of packet communication, and serially transmits it via the transmitting and receiving device 965 to the mobile phone 40.

The information processing device 480 of the mobile phone 40 records the transmitted image data sequentially in the recording device such as the memory 484 or the non-volatile memory 482. And after the end of receiving all the image data, the information processing device 480 issues an instruction of expanding the predetermined received compressed image data and displaying the expanded image data on the display device 468. Then, the display device 468 displays the still image or movie picture specified by the user.

Though in the above embodiment, the mobile terminal receives the image, the present invention is not limited to the uses where the image is received according to the reproducing ability of the mobile terminal, but may be applicable to the uses where the mobile phone receives the music information such as MP3 or ATRAC, or incoming melodies.

As above described, according to the image server with the present invention, using the identification information of the movie picture received from the mobile terminal, and the number of pixels, gradation, frame rate, compression format, reproducible bandwidth or image size of the movie picture, or the type of the mobile terminal in terms of the reproducing ability, the corresponding movie picture is retrieved from the image database where a plurality of movie pictures are recorded, and transmitted to the mobile terminal. Hence, the image server can automatically and efficiently retrieve and transmit the rich contents of the movie picture to the mobile phone with lower reproducing ability.

Also, with another embodiment of the present invention, the image server comprises the image converting device for retrieving the corresponding movie picture from the original image database where a plurality of original movie pictures are recorded, on the basis of the identification information of the movie picture received from the mobile terminal, and converting the retrieved original movie picture into the movie picture conformable to the reproducing ability of the mobile terminal, using the number of pixels, gradation, frame rate, compression format, reproducible bandwidth or image size of the movie picture received from the mobile terminal, or the type of the mobile terminal, and the transmitting device for transmitting the converted movie picture to the mobile terminal. Hence, the image server can automatically and efficiently convert and transmit the original movie picture into the rich contents of the movie picture conformable to the reproducing ability of the mobile terminal with lower reproducing ability.

With the present invention, the image display system comprises the mobile terminal for automatically transmitting to the image server the number of pixels, the gradation, the frame rate, the compression format, the reproducible bandwidth, or the image size of the movie picture reproducible on the mobile terminal, or the type of the mobile terminal in terms of the reproducing ability, and displaying on the display device the movie picture in accordance with the image size or the type of the mobile terminal received from the image server, and the image server for retrieving the corresponding movie picture from the image database where a plurality of movie pictures are recorded, using the image size of the movie picture or the type of the mobile terminal received from the image server and transmitting it to the mobile terminal. Hence, the image server can automatically and efficiently retrieve and transmit the rich contents of the movie picture to the mobile terminal with lower reproducing ability.

Accordingly, when the user peruses the rich contents of the movie picture, it was conventionally required that the image server on the service provider side prepared the image data in accordance with the communication bandwidth or reproducing ability of the mobile terminal for the user, and the user selected the movie picture having the amount of data according to the reproducing environment of its own or the contents of the image conformable to the reproducing ability. However, with the present invention, the image data conforming to the reproducing ability of the mobile terminal prepared for the reproducing side, is provided to the image server on the contents service provider side, whereby the user can acquire the optimal image data conformable to a reproducing device of the mobile terminal, without selecting the optimal data.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image server for transmitting a picture to a mobile terminal, wherein the image server is configured to:
    establish a bi-directional communication link with said mobile terminal,
    retrieve a picture from an image database where a plurality of pictures are recorded, using identification information of the picture received from the mobile terminal via the bi-directional communication link and at least one of (1) reproducibility information associated with the picture and (2) a reproducing ability associated with the mobile terminal, and
    transmit the picture to the mobile terminal,
    wherein the image database includes multiple candidate pictures corresponding to the identification information, the retrieved picture being one of the candidate pictures conforming to the reproducing ability of the mobile terminal.

2. An image server for converting an original picture into a picture conforming to a reproducing ability of a mobile terminal and transmitting the picture, the image server comprising:
    a receiving device, which establishes a bi-directional communication link with the mobile terminal and receives identification information of the original picture from the mobile terminal via the bi-directional communication link;
    an image converting device configured to:
        retrieve the original picture from an original image database where a plurality of original pictures are recorded, according to the identification information of the picture received from the mobile terminal, and
        convert the retrieved original picture into the picture conforming to the reproducing ability of the mobile terminal, using at least one of (1) reproducibility information associated with the picture and (2) a type of the mobile terminal; and
    a transmitting device, which transmits the converted picture to the mobile terminal.

3. An image display system for transmitting a picture conforming to a reproducing ability of a mobile terminal, the image display system comprising:
    a mobile terminal configured to:
        establish a bi-directional communication link with an image server and automatically transmit to the image server via the bi-directional communication link at least one of the following types of information: reproducibility of the picture, and reproducing ability of the mobile terminal, and
        display on a display device the picture received from the image server in accordance with the reproducibility of the picture or the reproducing ability of the mobile terminal; and
    the image server, which is configured to:
        retrieve the corresponding picture from an image database where a plurality of pictures are recorded, using the reproducibility information of the picture or the reproducing ability information of the mobile terminal received from the mobile terminal, and
        transmit the retrieved picture to the mobile terminal,
    wherein the image database includes multiple candidate pictures corresponding to the same identification information, the retrieved picture being one of the candidate pictures conforming to the reproducing ability of the mobile terminal.

4. The image server of claim 1, wherein the image server is configured to receive the reproducibility information from the mobile terminal via the bi-directional communication link.

5. The image server of claim 4, wherein
    the picture is part of a movie retrieved by the image server from a plurality of movies stored in the image database, and
    the reproducibility information includes at least one of: a number of pixels, a gradation, a frame rate, a compression format, and a reproducible bandwidth.

6. The image server of claim 1, wherein the image server is configured to receive information regarding a type of the mobile terminal via the bi-directional communication link, wherein the reproducing ability of the mobile terminal is discernible from the type of the mobile terminal.

7. The image server of claim 1, wherein the image server is configured to transmit the picture to the mobile terminal via the bi-directional communication link.

8. The image server of claim 7, wherein the image server is configured to establish the bi-directional communication link with the mobile terminal using the Internet.

9. The image server of claim 2, wherein the image server is configured to receive the reproducibility information from the mobile terminal via the bi-directional communication link.

10. The image server of claim 9, wherein
    the original picture is part of an original movie retrieved by the image server from a plurality of original movies stored in the image database, and the reproducibility information includes at least one of: a number of pixels, a gradation, a frame rate, a compression format, and a reproducible bandwidth.

11. The image server of claim 2, wherein receiving device is configured to receive information regarding the type of the mobile terminal via the bi-directional communication link.

12. The image server of claim 2, wherein the transmitting device is configured to transmit the converted picture to the mobile terminal via the bi-directional communication link.

13. The image server of claim 12 wherein the image server is configured to establish the bi-directional communication link with the mobile terminal using the Internet.

14. The image display system of claim 3, wherein
the corresponding picture is part of a movie retrieved by the image server from a plurality of movies stored in the image database, and
the reproducibility information includes at least one of: a number of pixels, a gradation, a frame rate, a compression format, and a reproducible bandwidth.

15. The image display system of claim 3, wherein the reproducing ability information identifies a type of the mobile terminal, the reproducing ability of the mobile terminal being discernible from the type of the mobile terminal.

16. The image display system of claim 3, wherein
the mobile terminal is configured to transmit identification information of the movie picture to the image server via the bi-directional communication link, and
the image server uses the identification information to retrieve the picture from the image database.

17. The image display system of claim 3, wherein the image server is configured to transmit the picture to the mobile terminal via the bi-directional communication link.

18. The image server of claim 17, wherein the bi-directional communication link is established using the Internet.

19. The image server of claim 1, wherein the picture is a still image retrieved by the image server from a plurality of still images stored in the image database.

20. The image server of claim 2, wherein the original picture is an original still image retrieved by the image server from a plurality of original still images stored in the image database.

21. The image display system of claim 3, wherein the corresponding picture is a still image retrieved by the image server from a plurality of still images stored in the image database.

22. The image server of claim 1, wherein a user of the mobile terminal selects a picture to be reproduced on the mobile terminal, the identification information being generated to identify the selected picture to the image server.

23. The image server of claim 2, wherein a user of the mobile terminal selects a picture to be reproduced on the mobile terminal, the identification information being generated to identify the selected picture to the image server.

24. The image display system of claim 3, wherein
the mobile terminal is further configured to:
permit a user to select a picture to be reproduced on the mobile terminal,
generate the identification information to order to identify the selected picture to the image server, and
forward the identification information to the image server; and the image server is further configured to:
use the identification information to retrieve the picture from the image database.

* * * * *